United States Patent [19]
Lucas et al.

[11] 3,728,786
[45] Apr. 24, 1973

[54] METHOD OF MANUFACTURE OF A PERMANENT-MAGNETIZED ROTOR FOR A SYNCHRONOUS MOTOR

[75] Inventors: Pierre Lucas, Dourg-Les-Valence, Pierre Paillet, Pierre-Curie-Valence, both of France

[73] Assignee: Crouzet, Paris, France

[22] Filed: Nov. 15, 1971

[21] Appl. No.: 198,892

[30] Foreign Application Priority Data

Nov. 16, 1970 France..............................7041294

[52] U.S. Cl. ..................29/598, 29/608, 264/262, 264/266, 310/43, 310/156, 310/261
[51] Int. Cl. ......................H02k 15/02, H02k 15/10
[58] Field of Search........................29/596, 598, 608; 310/43, 45, 156, 261; 264/262, 266

[56] References Cited

UNITED STATES PATENTS

| | | |
|---|---|---|
| 3,077,658 | 2/1963 | Wharton..........................264/266 X |
| 2,488,729 | 11/1949 | Kooyman ..........................310/261 |
| 3,502,914 | 3/1970 | Cox..................................310/43 X |
| 3,246,187 | 4/1966 | Iemura.............................310/156 |
| 3,488,837 | 1/1970 | Massonda et al......................29/598 |

FOREIGN PATENTS OR APPLICATIONS

| | | |
|---|---|---|
| 1,441,677 | 5/1966 | France |
| 1,460,560 | 10/1966 | France |

*Primary Examiner*—Charles W. Lanham
*Assistant Examiner*—Carl E. Hall
*Attorney*—Holman & Stern

[57] ABSTRACT

A method of manufacture of a permanent-magnetized rotor for a small multipolar synchronous motor from a rectangular tape made of a flexible plastomagnetic material comprising an organic binder loaded with magnetic powder, wherein said flexible tape has a rectangular or square cross-section and is cut to suitable dimensions and then shaped as a ring with a trapezoidal cross-section through contiguous winding on a cylindrical mandrel with a suitable diameter and is subjected to a curing operation designed to impart to it a predetermined stiffness while maintaining in it a slight expansibility, due to the controlled curing of the binder and then after the concentric introduction of the ring and of an axis in a mold with a cylindrical wall, the axis and the ring are made integral through injection of a thermoplastic or thermosetting material or of a metal having a low melting point whose pressure tends to apply the ring onto said cylindrical wall of the mold the internal diameter of which corresponds precisely to the external diameter of the finished rotor.

1 Claim, 2 Drawing Figures

Patented April 24, 1973  3,728,786
FIG_1_
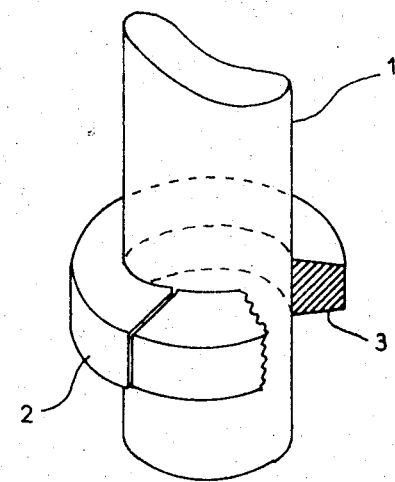
FIG_2_
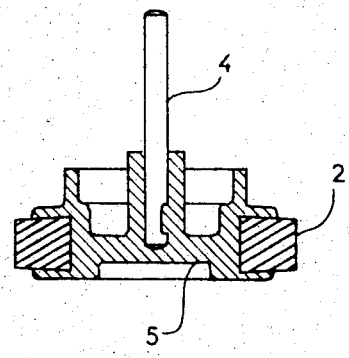

METHOD OF MANUFACTURE OF A PERMANENT-MAGNETIZED ROTOR FOR A SYNCHRONOUS MOTOR

This invention relates to a method of manufacture of a permanent-magnetized rotor for a small multipolar synchronous motor by molding of a ring made of a magnetic oxide with a thermosetting or thermoplastic synthetic substance.

This type of rotor consisting of a molded ferrite ring, such as described in French Pat. Nos. 1,460,560 or 1,441,677, is well known but its construction is delicate due to the fact that the material comprising the ring does not sufficiently withstand the tensile stresses to which it is subjected upon molding.

Various methods such as that described in French Pat. No. 1,432,147, have been developed in order to avoid the strains on the ring upon molding, but these methods use complex molds or require additional and costly operations such as the removal of superfluous material after molding.

The method according to the invention eliminates these drawbacks. To this effect, the invention relates to a method of manufacture of a permanent-magnetized rotor for a small multipolar synchronous motor from a rectangular tape made of a flexible plastomagnetic material consisting of an organic binder loaded with magnetic powder, wherein said flexible tape has a rectangular or square cross-section and is cut to suitable dimensions and placed as a ring having a trapezoidal cross-section through contiguous winding on a cylindrical mandrel with a suitable diameter and is cured so as to impart to it a predetermined stiffness while maintaining in it a slight expansibility, as a result of the controlled curing of the binder and then, afte the concentric introduction of the ring, and of a shaft in a mold having cylindrical walls, the shaft and the ring are made integral through injection of a thermoplastic or thermosetting material or of a metal having a low melting point whose pressure tends to apply the ring onto said cylindrical wall of the mold the internal diameter of which corresponds precisely to the external diameter of the finished rotor.

The method consists in using a tape made of a flexible thermosetting material having valuable magnetic properties and whose right section is either a square or a rectangle of suitable size. Upon cutting of this tape and shaping into a ring on a cylindrical former, its right section takes on the form of a trapezoid whose larger base is located towards the center of the former, due to the compression of the internal fibers at the bend. The thus formed rings are maintained by a tube on the former and are subsequently cured which sets them in the shape of split rings with contiguous edges whose external diameter has been predetermined with accuracy by the former.

The modulus of residual elasticity of these rings, made, for example, of a material sold under the registered trade mark "Plastomag" is sufficient to provide for their molding, without any special precautions around an axis of all desired shapes in order to obtain a rotor for a small synchronous motor with or without a pinion and shapes such as to co-operate with an arrester. Indeed, since the right trapezoidal section of the ring is in counter-clearance, the latter remains snugly anchored in the assembly comprising the rotor forming unit.

The invention is illustrated, by way of example, by the appended drawing:

FIG. 1 shows a ring (2), shaped on a cylindrical former, a portion of the ring (2) having been removed to show its trapezoidal cross-section (3).

FIG. 2 shows the diametrical section of an embodiment of a rotor obtained using this method. A plastic material 5 provides the connection between a shaft 4 and a split magnetic ring 2 which leads, according to the invention, to a rotor for a small synchronous motor.

The method according to the invention is especially well suited for constructing rotors for small synchronous motors. What we claim is:

1. A method of manufacture of a permanent-magnetized rotor for a small multipolar synchronous motor for a rectangular tape made of a flexible plastomagnetic material comprising an organic binder loaded with magnetic powder, comprising the steps of; cutting said flexible tape to a suitable length; winding the length of tape onto a cylindrical mandrel to shape said length into the form of a ring having a trapezoidal cross-section; performing a controlled curing operation on the organic binder of said ring such that said ring has a predetermined stiffness but retains the ability to slightly expand; introducing said ring and a shaft into a mold having a cylindrical wall, said wall, said ring and said shaft being in concentric relationship, said wall having an internal diameter which precisely corresponds to the desired external diameter of the finished rotor; injecting a molding material into the mold thereby expanding said ring against said wall; solidifying said molding material to thereby form an integral structure of said shaft, said molding material and said ring.

* * * * *